United States Patent
Sahashi et al.

[11] Patent Number: 5,190,599
[45] Date of Patent: Mar. 2, 1993

[54] MAGNETIC MEMORY AND MAGNETIC ALLOY THEREOF

[75] Inventors: Masashi Sahashi, Yokohama; Yoichi Tokai, Urayasu; Tomomi Funayama, Yokohama, all of Japan

[73] Assignee: Kabushiki Kaisha Toshiba, Kanagawa, Japan

[21] Appl. No.: 586,983

[22] Filed: Sep. 24, 1990

[30] Foreign Application Priority Data

Sep. 26, 1989 [JP] Japan .................. 1-247940

[51] Int. Cl.$^5$ .................. C22C 30/04; H01F 1/047
[52] U.S. Cl. .................. 148/315; 420/581
[58] Field of Search ........... 148/300, 301, 304–311, 148/314, 315; 420/72, 434, 581, 583

[56] References Cited

U.S. PATENT DOCUMENTS

| | | | |
|---|---|---|---|
| 4,671,828 | 6/1987 | Yamauchi et al. | 148/309 |
| 4,683,012 | 7/1987 | Yamauchi et al. | 148/301 |
| 4,735,772 | 4/1988 | van der Zel | 420/583 |
| 4,881,989 | 11/1989 | Yoshizawa et al. | 148/307 |
| 4,985,089 | 1/1991 | Yoshizawa et al. | 148/311 |
| 4,995,923 | 2/1991 | Mizumoto et al. | 148/304 |

FOREIGN PATENT DOCUMENTS

| | | | |
|---|---|---|---|
| 2820377 | 8/1979 | Fed. Rep. of Germany | 148/311 |
| 64-25329 | 1/1989 | Japan | 148/306 |

*Primary Examiner*—George Wyszomierski
*Attorney, Agent, or Firm*—Finnegan, Henderson, Farabow, Garrett and Dunner

[57] ABSTRACT

A magnetic memory and a magnetic alloy thereof are disclosed, which comprise a magnetic alloy whose main phase is an iso-molar compound phase, the iso-molar compound phase being represented with general expression $Pt(Fe_{1-x} Mn_x)Sn$ where the relationship of $0 < x < 1$ is satisfied, wherein the magnetic memory records information by changing a magnetic property of the magnetic alloy.

6 Claims, 7 Drawing Sheets

MAGNETIC MEMORY AND MAGNETIC ALLOY THEREOF

BACKGROUND OF THE INVENTION

1. Field of the Invention

The present invention relates to a magnetic alloy suitable for a magnetic memory using a temperature change in a magnetized state and for the structure of the magnetic memory.

2. Description of the Related Art

As a device using a temperature change in the magnetized state, a temperature sensor, a magneto-optical memory, and so forth have been made and studied. These devices only use a change of the magnetic properties at around the critical temperature such as the magnetic transition temperature, the magnetic compensation temperature, and the spin reorientation temperature of magnetic materials, for example, magnetic alloys. In other words, the temperature sensor and the magneto-optical memory basically use the change of magnetic properties at around the critical temperature. Namely, they positively use neither a heat hysteresis nor a storage effect of the magnetized state by means of temperature.

SUMMARY OF THE INVENTION

An object of the present invention is to provide a new conceptual magnetic memory which uses a heat hysteresis bringing a remarkable magnetic property.

Another object of the present invention is to provide a magnetic memory whose structure is simple and which is easily handled.

Another object of the present invention is to provide a magnetic alloy suitable for composing a magnetic memory using a heat hysteresis bringing a remarkable magnetic property.

The magnetic memory according to the present invention is a magnetic alloy whose main phase is a iso-molar compound phase represented with the following expression:

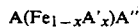

where A is a Pt or a substitution where part of Pt is substituted with another noble metal element; A' is at least one element selected from a group of Mn, Co, and Ni or a substitution where part thereof is substituted with another transition metal element; A" is at least one element selected from a group of Sn, Al, Ga, In, Tl, Ge, Hg, Sb, Si, Pb, Bi, and Zn; the relationship of $0<x<1$ is satisfied. The magnetic alloy has a remarkable heat hysteresis. When the magnetic alloy is cooled in a particular temperature range, it has a magnetic property (magnetization) at a temperature when it is cooled. Even at the same temperature, the magnetic alloy always has the magnetic property (magnetization) when it was cooled. Thereby, the magnetic alloy has a memory effect. In other words, when the magnetic alloy whose main phase is the iso-molar compound phase represented with the aforementioned expression

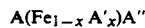

is heated, the magnetization disappears. However, when the magnetic alloy is heated and then cooled even in the state where the magnetization disappears, by selecting the temperature at which it was cooled, the magnetic property (magnetization) can be freely set and provided. In addition, the magnetic alloy securely keeps the provided magnetic property (magnetization).

Thus, the magnetic memory according to the present invention uses the new conceptual memory effect based on the heat hysteresis of the aforementioned magnetic alloy.

DESCRIPTION OF PREFERRED EMBODIMENT

Then, the magnetic memory and the basic structure of the magnetic alloy suitable for the magnetic memory will be described in the following.

First, the inventors thought that in a magnetic material such as a magnetic alloy, if a remarkable heat hysteresis is provided as a magnetic property, only by changing a heating temperature, different magnetic properties can be accomplished at the same temperature (for example, at a room temperature), namely a memory function can be accomplished.

In other words, the inventors of the present invention started the study in focusing on iso-molar compounds such as PtFeSn which had been studied as a NiAs type compound (Phys. Stat. Sol, (a) 86, 655 (1984). The iso-molar compound such as PtFeSn has a unique crystal structure where magnetic atom Fe is equally disposed between the Pt side and the Sn side. In addition, the Curie temperature of the iso-molar compound is 740° C., which is close to that of pure iron. Fe which is bonded to Pt has ferromagnetism, while Fe which is bonded to Sn has non-magnetism. Thus, the iso-molar compound has remarkably structure-sensitive magnetism. On the other hand, another iso-molar compound PtMnSb, which has a crystal structure of the same group and which is a Clb type Heusler's alloy, has a large polar force, namely a large rotating angle (2 $\phi$K) (PHys. Rev. Lett. 50, 2024 (1983)).

Figure 1:
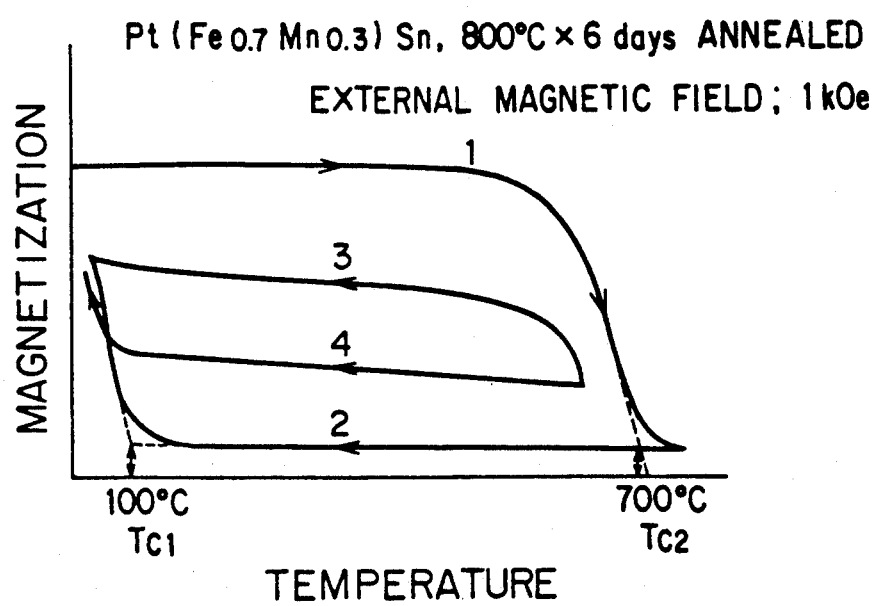
FIGS. 1, 5, and 7 are schematics with respect to magnetization and temperature properties of a magnetic alloy composing a magnetic memory according to the present invention.

The inventors focused on the aforementioned two types of iso-molar compounds and accomplished to substitute part of Fe in PtFeSn with Mn. As the result, we found that the alloy $Pt(Fe_{1-x}Mn_x)Sn$ has a remarkable property of heat hysteresis. For example, after $Pt(Fe_{0.7}Mn_{0.3})Sn$ is arc-melted and then homogeneous heat treatment is conducted to it at 800° C. for six days, the temperature change of the magnetization of the alloy was as shown in FIG. 1. As shown in the figure, for $Pt(Fe_{0.7}Mn_{0.3})Sn$, the magnetization disappears when it is heated to more than 700° C. ($Tc_2$) and the magnetization takes place at a temperature less than approx. 100° C. ($Tc_1$). On the other hand, when the compound is cooled from the critical temperature $T_{c1}$ at which the magnetization takes place to the critical temperature $T_{c2}$ at which the magnetization disappears, the magnetization at the temperature when the compound was cooled is kept in the temperature range and thereby it was found that the compound has a remarkable heat hysteresis.

The unique property for Pt $(Fe_{1-x} Mn_x)$ is accomplished in the condition of $0 < x < 1$. In other words, even if small amount of Fe is substituted with Mn, the property of heat hysteresis is obtained. The preferable condition is in $0.01 \leq x \leq 0.99$. Thus, the iso-molar compound phase of $Pt(Fe_{1-x} Mn_x)Sn$ can be produced by heating at a temperature at which the spontaneous magnetization disappears (for example, a temperature exceeding the Curie temperature, $T_{c2}$) to a casting alloy. The heat treatment condition can be selected depending on the composition to be used. Generally, the heat treatment to be applied is at 50° C. to 1200° C. for $10^{-6}$ Hr to 1 Hr.

Figure 2:
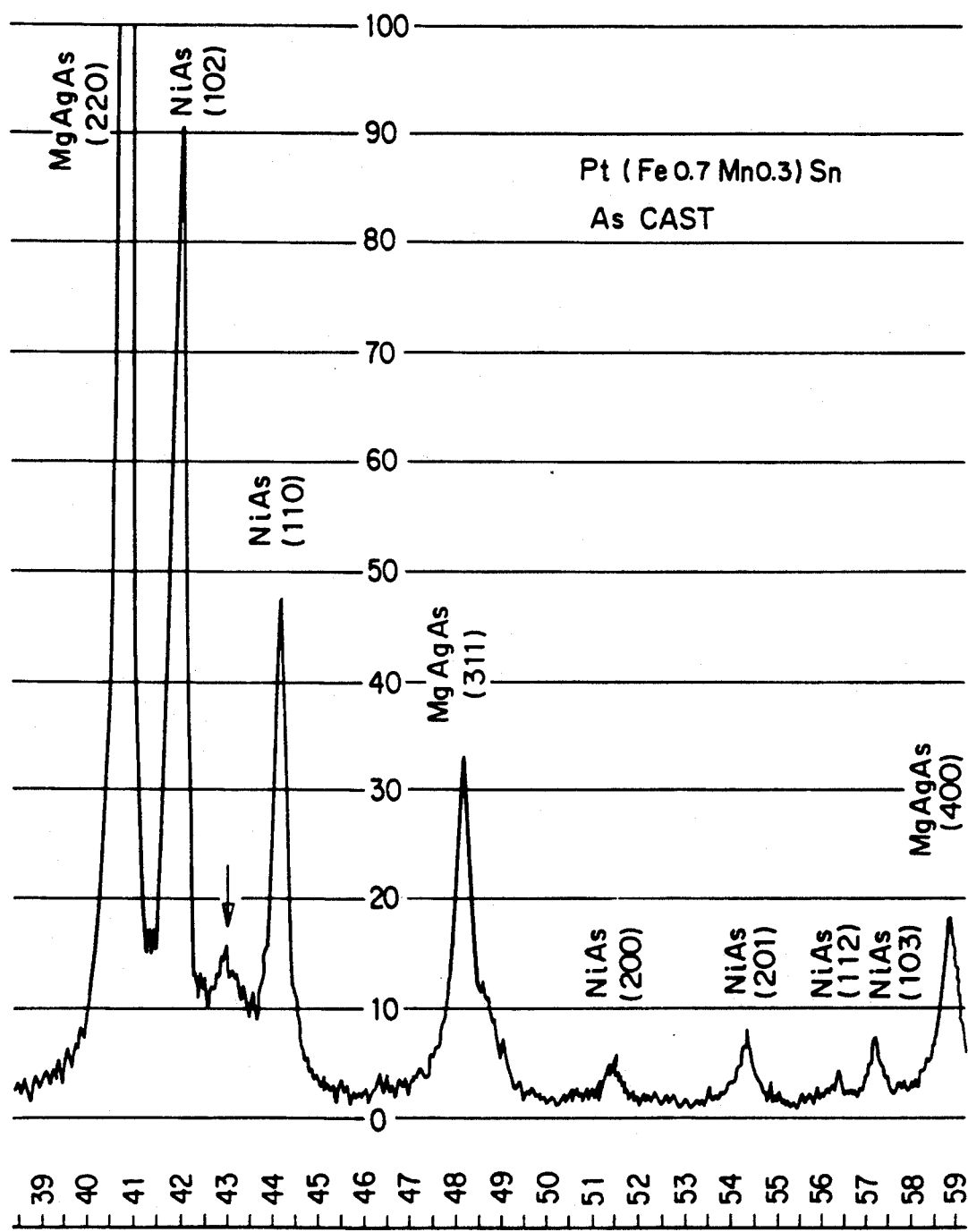
FIGS. 2 and 3 are X ray diffraction charts of the magnetic alloy composing the magnetic memory according to the present invention.
Figure 3:
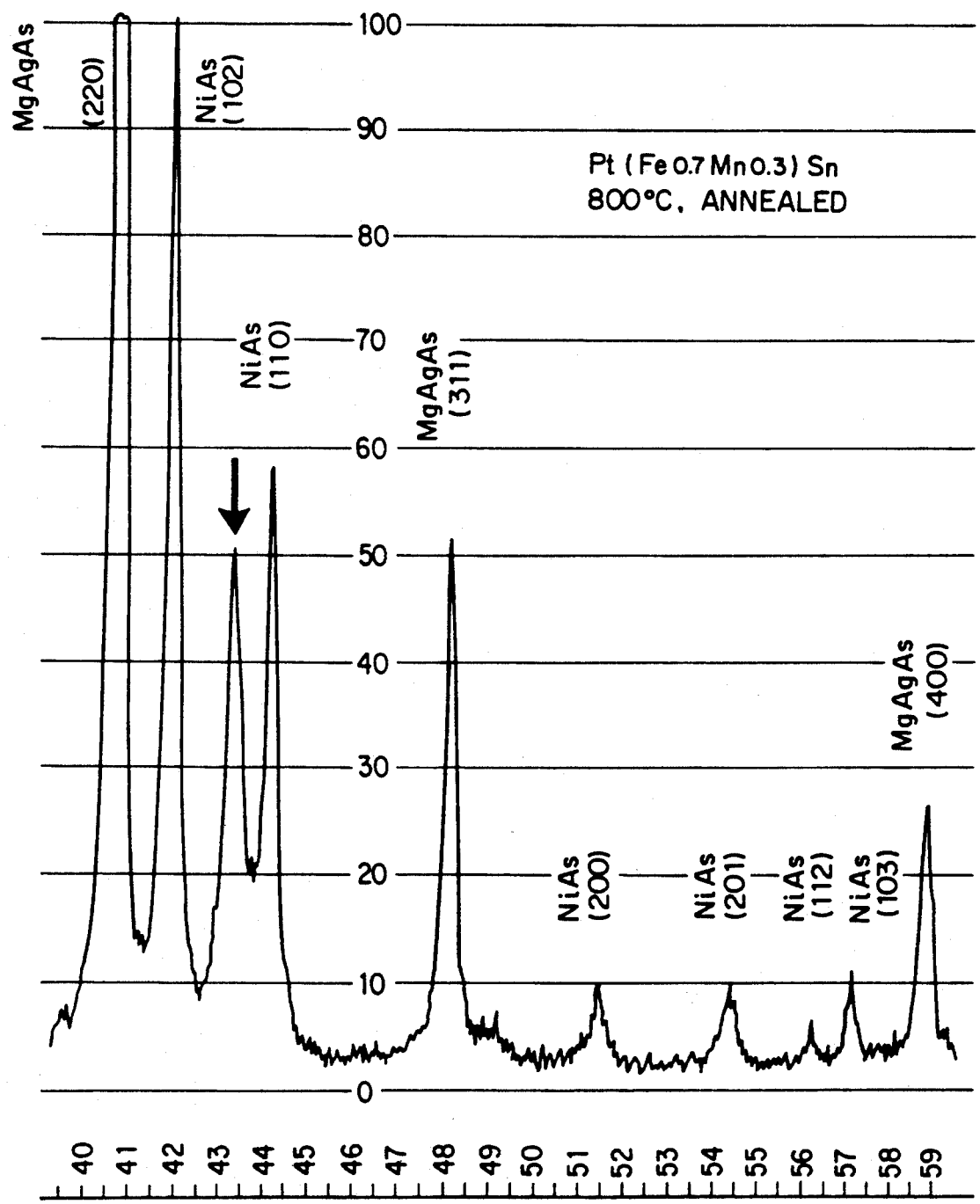
Figure 4:
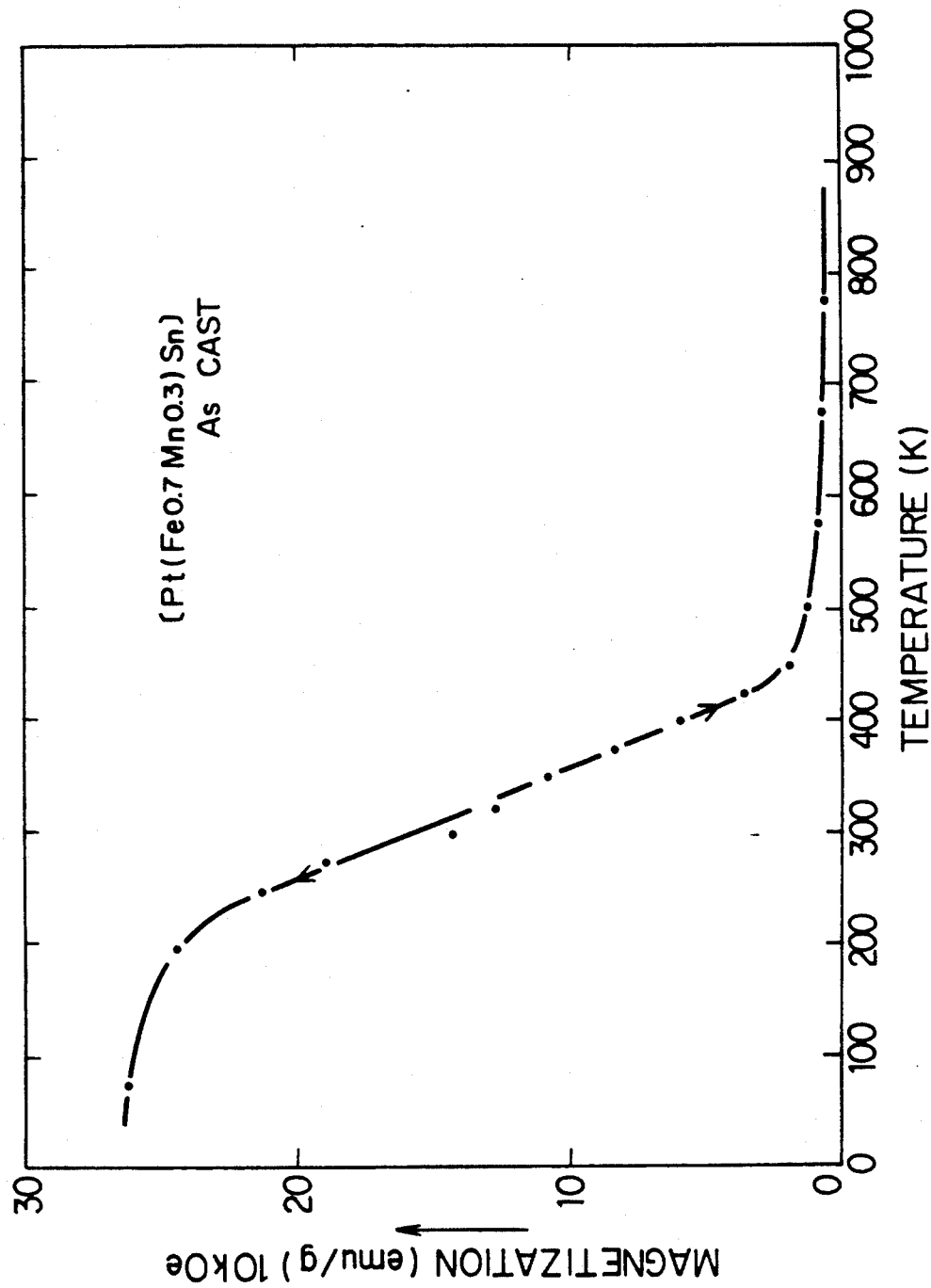
FIG. 4 is a chart with respect to the magnetization and temperature properties before conducting a thermal treatment for the magnetic alloy structuring the magnetic memory according to the present invention.

The X ray diffraction pattern of the aforementioned $Pt(Fe_{0.7} Mn_{0.3})Sn$ before conducting the heat treatment is as shown in FIG. 2. The pattern after conducting the heat treatment is as shown in FIG. 3. By comparing FIGS. 2 and 3, it is estimated that the crystal phase of compound between metals according to the peak which exists in $2\theta = 43$ to 44° C. is the NiAs type iso-molar compound phase which affects the heat hysteresis property. On the other hand, in the as cast state, namely, before the heat treatment is conducted, the heat hysteresis does not take place (FIG. 4).

For the aforementioned $Pt(Fe_{0.7} Mn_{0.3})Sn$, the NiAs type iso-molar compound affecting the heat hysteresis property can be made of a plurality of phases besides the single phase.

In the above description, $Pt(Fe_{0.7} Mn_{0.3})Sn$ was described. However, any compound in the same structure has the same heat hysteresis property. In other words, a magnetic metal whose main phase is an iso-molar compound phase A: $(Fe_{1-x} A'_x)$: A'' (1:1:1 in molar ratio) represented with the following general expression can be used for the structure of the magnetic memory according to the present invention.

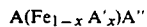

$$A(Fe_{1-x} A'_x)A''$$

where A is Pt or a compound where part of Pt is substituted with another noble metal; A' is a transition metal; A'' is a metal or a metalloid other than a noble metal and a transition metal element; and $0 < x < 1$).

In the expression, A is one of Ag, Au, Pt, Pd, Ir, and Rh. A is also substituted with Cu. A' is one of Mn, Co, and Ni. Besides Mn, Co, and Ni, A''' may include one of Sc, Ti, V, Cr, Y, Zr, Nb, Mo, Tc, Ru, Rh, Pd, Pt, Ir, Os, Re, W, Ta, Hf, and transition metal such as lanthanides element. A'' is one of Al, Ga, In, Tl, Hg, Ge, Sn, Sb, Si, Pb, Bi, and Zn. The preferable value of x is in the range of 0.01 to 0.99. In this case, when $(Fe_{1-a-b} A'_a A'''_b)$, it is preferable to satisfy the relationships of $0 < a < 1$, $b < 0.5$, and $a + b < 1$.

In other words, Fe in such an iso-molar compound is an essential element for obtaining the heat hysteresis property. By using elements Mn, Co, Ni, and so forth, the heat hysteresis property is remarkably improved. A''' relates to the adjustments of the magnetic transition temperature and heat hysteresis property. When the amount of A''' is too much, the magnetic property is decreased. Thus, it is necessary to satisfy the relationship of $y \leq 0.5$ at most. As the form of the magnetic alloy, a sintered form, film form, and so force are available.

As described above, since the magnetic alloy according to the present invention has the heat hysteresis property, it is possible to provide a different magnetization at the same temperature. Thus, the magnetic alloy can be satisfactorily used as a recording medium or a magnetic memory. An example of the magnetic alloy is described by using a heat hysteresis loop shown in FIG. 5.

Assume that the magnetization in the initial state is $B_1$ (in accordance with "0") and set the reference temperature $(T_0)$ of the recording medium to a value in the range from $T_{c1}$ to $T_{c2}$. $T_{c1}$ is the critical temperature at which the magnetization takes place, while $T_{c2}$ is the critical temperature at which the magnetization disappears.

First, in the recording state, the recording area is locally heated to a temperature area of $T_{c2}$ or more by a heating means such as an energy beam, for example, a laser beam. After that, the temperature is returned back to $T_0$ and thereby the magnetization disappears and the state $B_0$ (in accordance with "1") takes place. Thus, a spot of non-magnetization area takes place in the magnetization area.

The recording method is not limited to the aforementioned means. It is possible to use any method which can change the magnetizing state. A required write operation can be conducted by only changing the temperature without a bias magnetic field. On the other hand, the erase operation can be performed by changing the temperature of the magnetic memory (magnetic alloy) to the temperature area of Tc or less.

When the heating operation of the magnetic memory is stopped in the transition area changing from $B_1$ to $B_0$, since the magnetization $B_2$ $(B_1 > B_2 > B_0)$ at that time is kept at the temperature $T_0$, by selecting and setting the aforementioned temperature, multiple value recording becomes available besides two-value recording of "0" and "1".

On the other hand, data recording in the magnetic memory can be directly read by using a magnetic head or the like. However, it is possible to use the polarizing diffraction of the magnet-optical effect.

Figure 5:
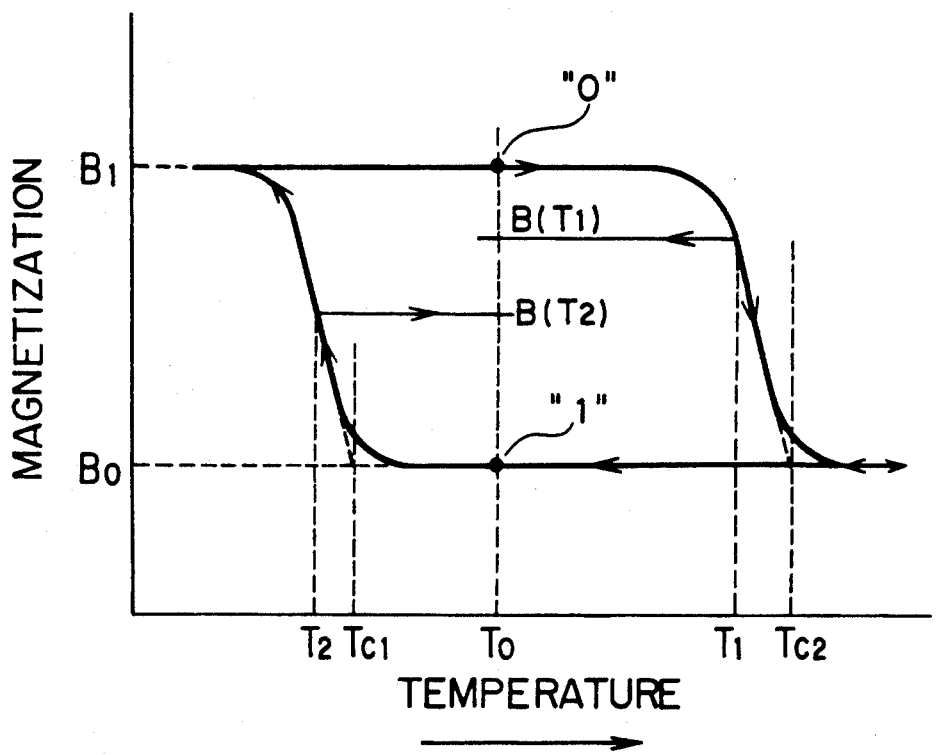

In addition, the heat hysteresis property of the aforementioned magnetic alloy can be used as a temperature sensor. In other words, in the transition area of $B_1$ to $B_0$ shown in FIG. 5, since the magnetization accords with the temperature, by reading the magnitude of the magnetization directly or through the related property, it is possible to measure the temperature. The temperature measurement is conducted in the same manner in the transition area of $B_0 \rightarrow B_1$ on the low temperature side. FIG. 5 shows the temperature $T_1$ on the high temperature side $(B_1 \rightarrow B_0)$ and the respective magnetization B $(T_1)$; and the temperature $T_2$ on the low temperature side $(B_0 \rightarrow B_1)$ and the respective magnetization B $(T_2)$.

By using an arc melting furnace, an alloy consisting of six compounds which are $Pt(Fe_{0.9} Mn_{0.1})Sn$, $Pt(Fe_{0.8} Mn_{0.2})Sn$, $Pt(Fe_{0.7} Mn_{0.3})Sn$, $Pt(Fe_{0.6} Mn_{0.4})Sn$, $Pt(Fe_{0.5} Mn_{0.5})Sn$, and $Pt(Fe_{0.3} Mn_{0.7})Sn$ were melted and cast. After the alloy was heated at 800° C. for six days, a magnetic field of 14 kOe (max) was applied to the obtained magnetic alloy by using a VSM (vibration sample type flux meter). The result is shown in FIG. 6.

Figure 6:
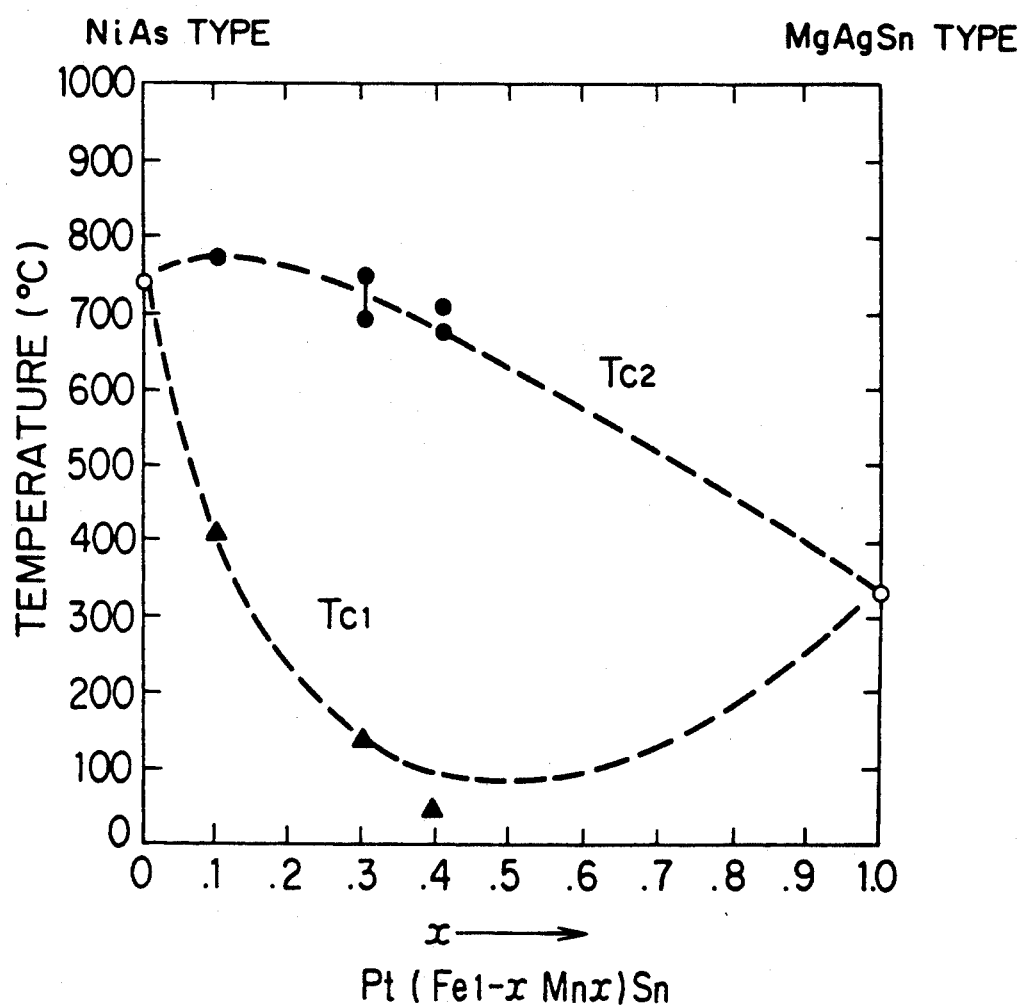
FIG. 6 is a chart with respect to a temperature at which the magnetization disappears by heating the magnetic alloy, a temperature at which the magnetization takes place by cooling the magnetic alloy, and x dependency of the magnetic alloy structuring the magnetic memory according to the present invention.
Figure 7:
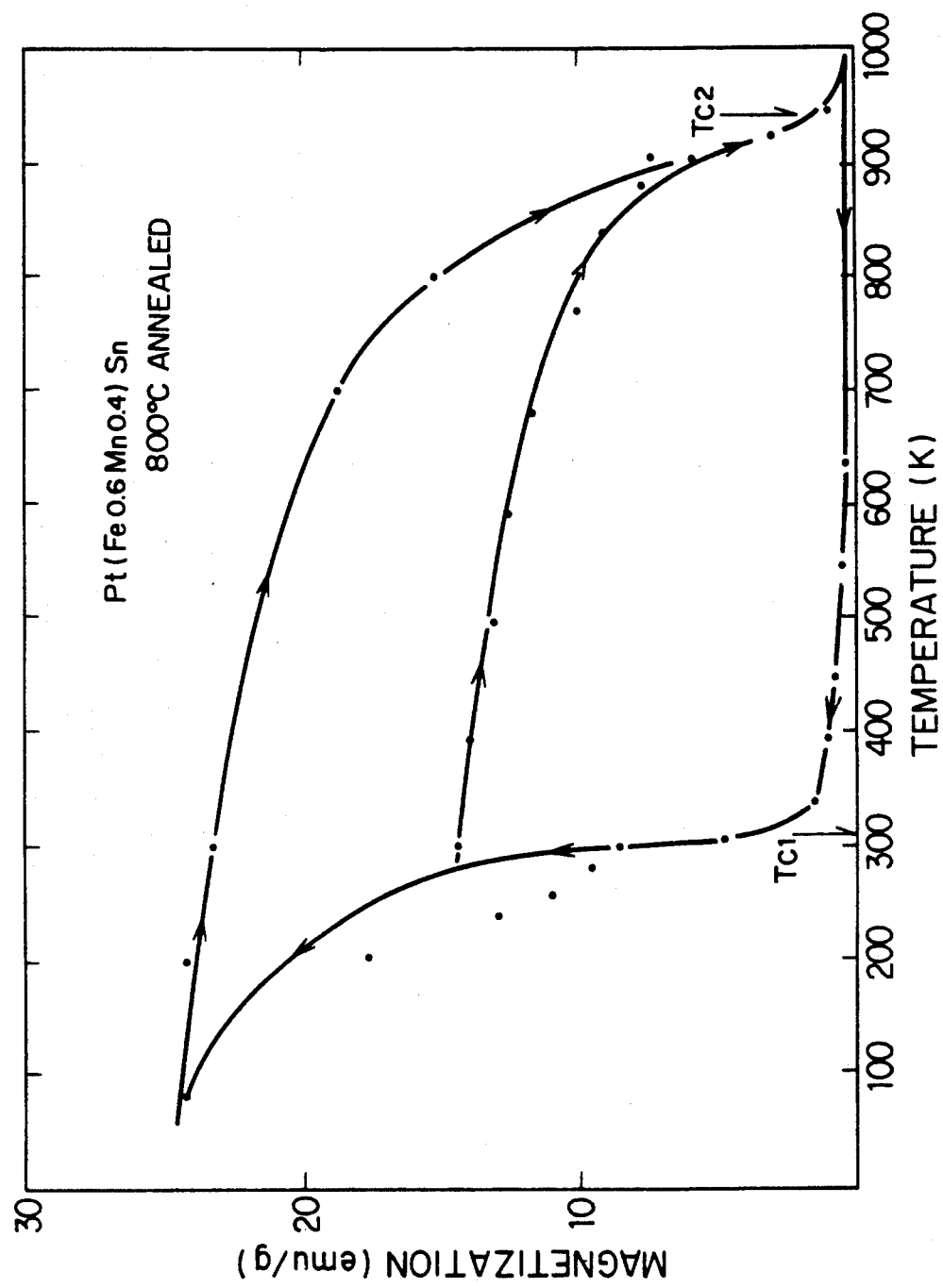

FIG. 6 shows the relationship between the critical temperature $T_{c1}$ at which the magnetization takes place by the cooling operation and the critical temperature $Tc_2$ at which the magnetization disappears by the cooling operation by using x of $Pt(Fe_{1-x}Mn_x)Sn$ of the aforementioned magnetic alloys. As shown in the figure, when $x=0$ and $x=1$, namely, in PtFeSn and PtMnSn, there is no distinction between the critical temperature $Tc_1$ at which the magnetization takes place by the cooling operation and the critical temperature $Tc_2$ at which the magnetization disappears by the heating operation. In other words, in the figure, only the conventional Curie temperature is observed. However, from the figure, it is clear that the heat hysteresis takes place when the relationship of $0<x<1$ is satisfied. For example, in the case of $Pt(Fe_{0.6}Mn_{0.4})Sn$, the heat hysteresis of the magnetization as shown in FIG. 7 takes place. In a wide temperature range from approx. 300 to 900 K, a remarkable heat hysteresis takes place.

By using the aforementioned alloys which had been made through the heat treatment, magnetic memories were formed. The recording area of each magnetic memory was locally heated with a laser light at a temperature between the critical temperature $Tc_1$ at which the magnetization takes place by the cooling operation and the critical temperature $Tc_2$ at which the magnetization disappears by the heating operation. In other words, by stopping the heating operation in the midway of the transition area where $B_1$ is changed to $B_0$ in FIG. 5, the magnetization $B_2$ ($B_1>B_2>B_0$) is kept at the temperature $T_0$ and thereby two-value recording of "0" and "1" takes place. The data being recorded in such a manner could be read by using the magnet-optical memory.

In the above example, an embodiment of $Pt(Fe_{1-x}Mn)Sn$ group was described. The same operation and effect could be accomplished in another iso-molar compound represented with the following expression $A(Fe_{1-x}A'_x)A''$.

As was described above, according to the present invention, it is possible to provide a new magnetic memory using a heat hysteresis property of magnetization, the magnetic memory having high reliability. It provides new magnetic alloys suitable for structuring such magnetic sensors and temperature sensors.

What is claimed is:

1. A magnetic memory, comprising a magnetic alloy having as a main phase an iso-molar compound phase, said iso-molar compound phase being represented with general expression $Pt(Fe_{1-x}Mn_x)Sn$ where a relationship of $0<x<1$ is satisfied, wherein said magnetic memory is capable of recording information by changing a magnetic property of said magnetic alloy, whereby said alloy possesses a degree of magnetization at a temperature $T_1$ such that said degree of magnetization is reobtained in said alloy when said alloy is both heated to a temperature $T_2$ so as to lose said magnetization and is then cooled to a temperature below $T_1$.

2. The magnetic memory as set forth in claim 1, wherein a relationship of $0.01 \leq x \leq 0.99$ is satisfied.

3. The magnetic memory as set forth in claim 1, wherein part of Fe is further substituted with at least one element selected from the group consisting of Sc, Ti, V, Cr, Y, Zr, Nb, Mo, Tc, Ru, Th, Pd, Pt, Ir, Os, Re, W, Ta, Hf and a lanthanide element.

4. A magnetic alloy, comprising:
an iso-molar compound phase being represented with general expressing $Pt(Fe_{1-x}Mn_x)Sn$ where the relationship of $0<x<1$ is satisfied, said iso-molar compound phase being a main phase, whereby said alloy possesses a degree of magnetization at a temperature $T_1$ such that said degree of magnetization is reobtained in said alloy when said alloy is both heated to a temperature $T_2$ so as to lose said magnetization and is then cooled to a temperature below $T_1$.

5. The magnetic alloy as set forth in claim 4, wherein the relationship of $0.01 \leq x \leq 0.99$ is satisfied.

6. The magnetic alloy as set forth in claim 4, wherein part of Fe is further substituted with at least one element selected from the group consisting of Sc, Ti, V, Cr, Y, Zr, Nb, Mo, Tc, Ru, Th, Pd, Pt, Ir, Os, Re, W, Ta, Hf and a lanthanide element.

* * * * *